Patented Oct. 16, 1928.

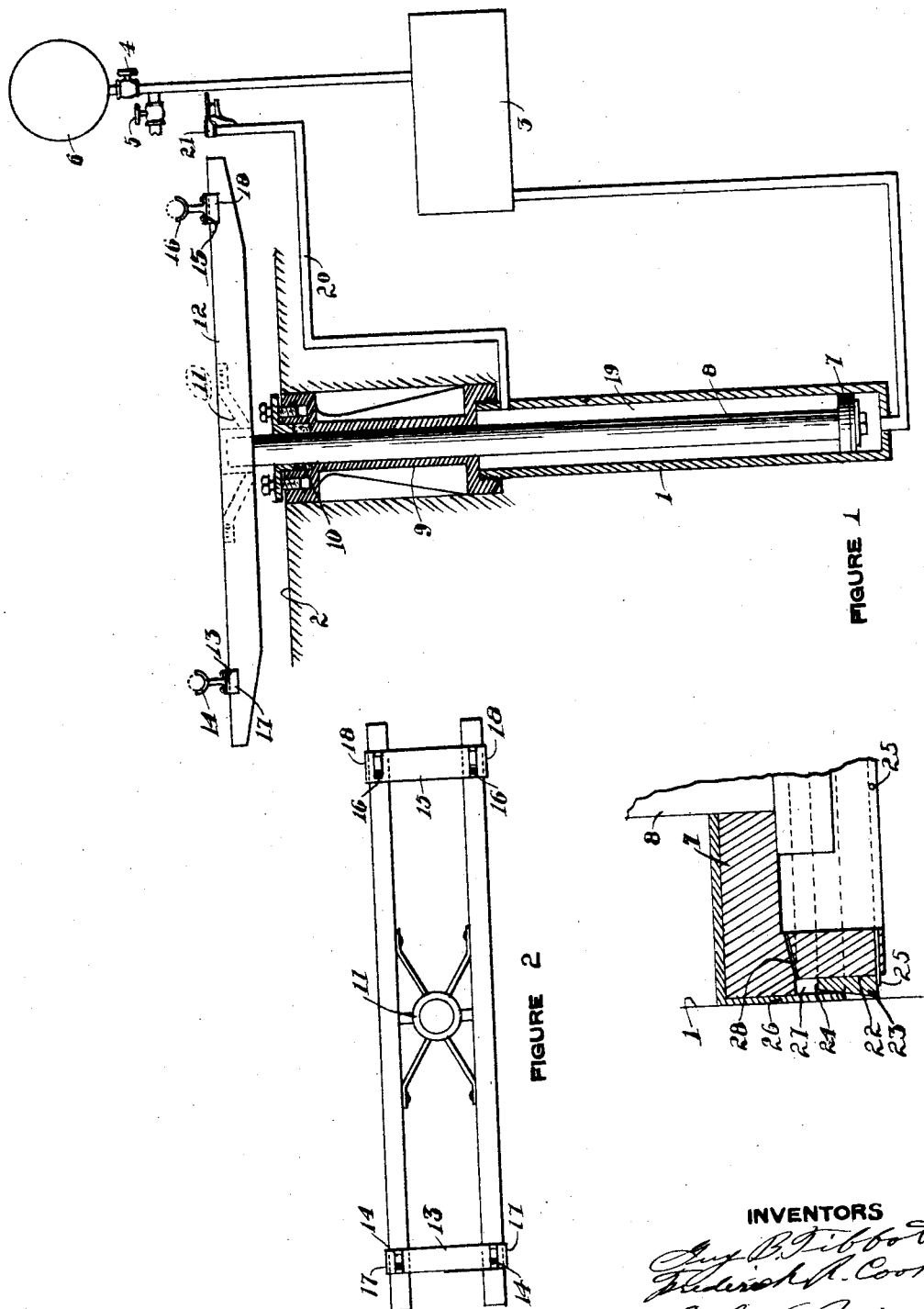

1,687,908

UNITED STATES PATENT OFFICE.

GUY B. TIBBOT, OF SANTA CRUZ, AND FREDERICK R. COOK, OF SAN JOSE, CALIFORNIA.

PISTON.

Application filed October 19, 1926. Serial No. 142,647.

This invention relates particularly to a device designed for lifting an automobile any desired distance from the ground.

It is one object of the invention to provide a device of the character indicated that can be freely rotated on a vertical axis and so function as a turntable as well as an elevating device, thereby permitting ready access to all the under parts of an automobile.

It is another object to provide a device of the character indicated in which few parts are exposed to view, and in which all of the working parts are effectually protected from water, dust and other foreign substances.

It is still another object of the invention to provide a centrally supported lifting platform, and means for equalizing any load that may be placed thereon.

Finally, it is an object to provide an hydraulic jack or fluid pressure operated lift that will be simple in construction, economical to manufacture, that will occupy but small space and that will be highly efficient in its practical application.

In the drawing:

Figure 1 is an elevation of the structure, partly in section.

Figure 2 is a plan view of the same.

Figure 3 is an enlarged detail section through a portion of the piston head of a structure embodying our invention.

Referring more particularly to the drawing, we show at 1 a cylinder which is, in the present case, imbedded in the ground below the floor level 2.

The cylinder 1 receives oil from a supply chamber or tank 3, and the oil in the supply tank may be placed under air pressure or released therefrom as desired by the operation of valves 4 and 5 respectively, valve 4 controlling the flow of air from a compressor 6 and valve 5 controlling the exhaust of the air from tank 3.

In the cylinder 1 is arranged a piston 7 mounted on the lower end of piston rod 8 which extends through the upper end of the cylinder to a point above the floor level 2. The upper end of the cylinder 1 is arranged a distance below the floor level 2 and has a comparatively long guide element 9 fitted with a packing gland at 10 mounted thereon as shown. The purpose of this gland is only to prevent access of water, dirt and other foreign matter from entering the cylinder, and to render the passage air-tight.

On the upper end of rod 8 is mounted a support 11 carrying a pair of spaced parallel horizontally arranged bars 12—12, the parts 7, 8, 11 and 12 and the end bars 13, forming a single unitary structure.

In order to raise an automobile clear from the floor and leave the wheels free to rotate it is necessary to provide some means of engagement between the frame and the front axle and the frame and the rear axle housing. It is also necessary to have the bars 12—12 spaced apart a distance less than the width of the automobile in the most economical and satisfactory construction.

To secure the proper contact with the automobile chassis we provide a bar 13 with upstanding supports 14 thereon. This bar is placed transversely of bars 12—12 near the ends thereof so that when the jack is raised the supports 14 will engage the ends of the front axle. On the other end of the frame a bar 15 is placed, and this bar carries supports 16 engaging the rear axle housing of the automobile when the jack is raised. By arranging the parts in this manner the revoluble parts of the machine may all be operated freely for washing, repairing, etc., and all of the under parts of the machine will be freely accessible to the washer or machinist. The bars 13 and 15 are bent over the sides of the bars 12—12 as shown at 17 and 18 to prevent lateral displacement, the said bars sliding freely on the bars 12 when not supporting a machine.

When this device is constructed and assembled as hereinbefore described, with the bars 12 in close proximity to the ground, and a vehicle in position thereover, the oil under pressure is admitted into cylinder 1 thereby causing the piston to slowly rise. As the piston rises the arms 14 and 16 on bars 13 and 15, engage the axle and axle housing of the vehicle and lift it bodily clear of the ground to any desired height. Releasing the air pressure will again, of course, lower the vehicle until it again rests upon its wheels.

The extended bearing portion 9 is ordinarily sufficient to maintain the frame 12—12 in a horizontal position even though the weight of the machine is not uniformly distributed thereover. By providing the movable bars 13 as described, however, the weight may be equally distributed over the frame by setting the machine a little forward or backward of the pivotal point as desired.

In this construction the cylinder is, of course, somewhat larger in diameter than the piston rod 8 whereby an air chamber 19 is formed therebetween. To permit the exhaust of the air in this chamber when the piston rises we provide a pipe 20 connecting with the chamber as shown and discharging at valve 21. Valve 21, however, is merely a pivoted member overbalanced so as to normally close the pipe and consequently the air can readily pass thereby as the piston rises.

This valve operates as a safety control of the device, because when the piston is in an elevated position it cannot suddenly drop even if the valve 5 is inadvertently opened, the vacuum formed in chamber 19 preventing the descent thereof. By opening the valve 21, however, and admitting air to the chamber the piston may be allowed to drop as desired.

The piston head 7 is preferably made with an annular shoulder 22 formed in its outer and lower edge, and a piston ring 23 is provided to slidably engage said shoulder. This ring is so formed that its lower outer edge has substantially the same diameter as the inner surface of the cylinder 1, and its outer surface receded somewhat to a narrower upper edge as shown at 24. The ring is held in position by a plurality of pins 25 engaging its lower edge, and the leather 26 passes downwardly over the ring a distance as shown. The pocket formed at 27 by this construction is provided with a leak at 28.

By means of this construction a downward movement of the piston will force the ring upwardly and consequently the leather will be forced outwardly and so held in perfect contact with the cylinder wall. The ring will be effectually held in any raised position it may reach by binding between the leather and piston head.

It is to be understood, of course, that while we have herein shown and described but one specific embodiment of our invention changes in form, construction and method of operation may be made within the scope of the appended claim.

We claim:

A piston comprising a piston head having an annular shoulder formed in its outer and lower edge, a cup leather mounted on the head and extending downwardly to overlap the said shoulder, an unbroken ring having its outer surface bevelled upwardly and inwardly toward the bottom of the shoulder slidably mounted on the piston head and extending beneath the adjacent edge of the cup leather, and a conduit connecting the chamber formed by the ring, cup leather and piston with the working face of the piston.

GUY B. TIBBOT.
FREDERICK R. COOK.